3,009,443
TREADLE OPERATED FEEDING TROUGH
John F. McCabe, Box 34, Robert Lee, Tex.
Filed Aug. 21, 1959, Ser. No. 835,284
7 Claims. (Cl. 119—55)

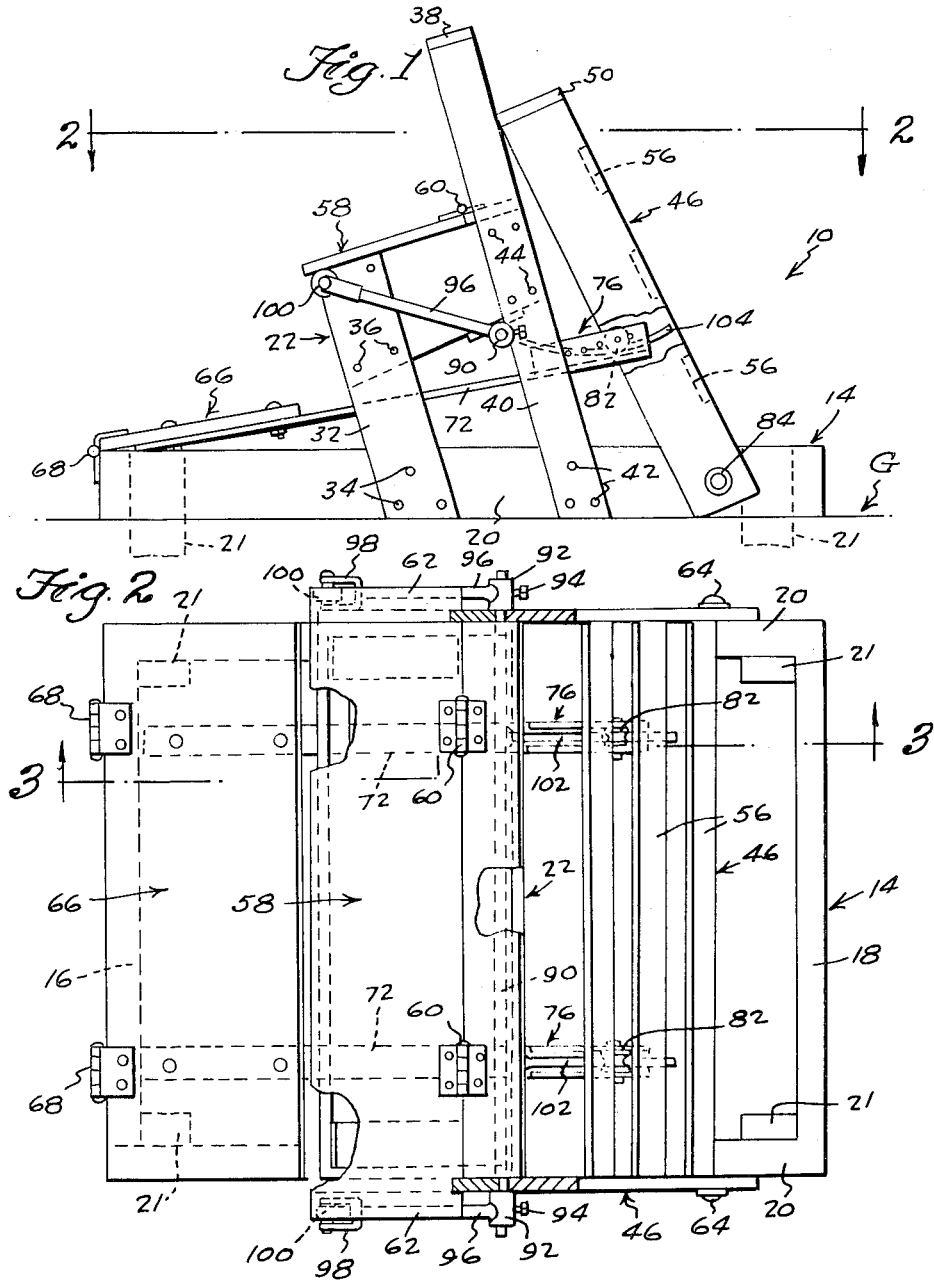

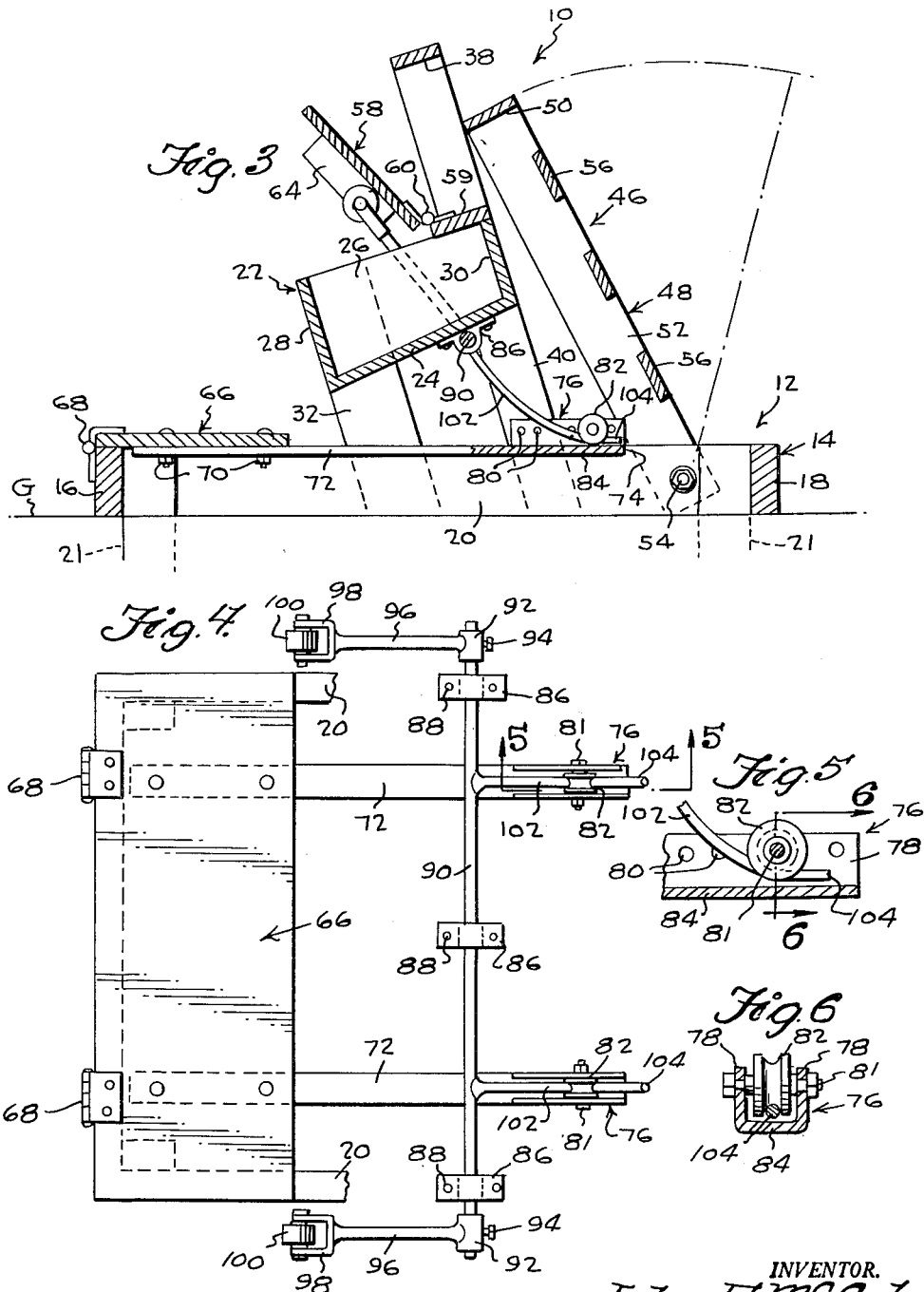

This invention relates to a novel animal feeding trough, having an automatically closed, treadle-operated lid.

The primary object of the invention is to provide an efficient device of the kind indicated, which is more reliable in operation under severe weather conditions, is easily operated by animals, and which is protected from being approached by animals, from the side remote from the treadle, by either a built-in guard, or by installing the device with its remote side against a fence.

Another object of the invention is to provide a device of the character indicated above, having lever and cam roller mechanism which efficiently connects the treadle with the lid of the trough, and achieves mechanical advantage and reduced friction, which contributes to long life for the mechanism and easy servicing thereof, and which is composed of parts which are readily replaced when worn, rusted, or broken.

Other important objects and advantageous features of the invention will be apparent from the following description and the accompanying drawings, wherein, for purposes of illustration only, a specific form of the invention is set forth in detail.

In the drawings:

FIGURE 1 is a side elevation of a device of the invention, showing the trough closed;

FIGURE 2 is a horizontal section, taken on the line 2—2 of FIGURE 1;

FIGURE 3 is a vertical transverse section, taken on the line 3—3 of FIGURE 2, and showing the trough lid in open position;

FIGURE 4 is a top plan view of FIGURE 1, the trough being broken away;

FIGURE 5 is an enlarged fragmentary transverse vertical section taken on the line 5—5 of FIGURE 4; and FIGURE 6 is a fragmentary section taken on the line 6—6 of FIGURE 5.

Referring in detail to the drawings, wherein like numerals designate like parts throughout the several views, the illustrated device, generally designated 10, comprises a horizontal ground-supported base 12, preferably in the form of an open rectangular wooden frame 14, having front and rear cross members 16 and 18, respectively, and side members 20. Corner blocks 21 secured in the corners of the frame 14 can be driven into the ground G to anchor the frame.

Mounted on and spaced above an intermediate part of the base frame 14 is a longitudinally elongated, forwardly canted rectangular trough 22, having a bottom wall 24, end walls 26 and front and rear walls 28 and 30, respectively. The trough is mounted on the frame 14 by means of forwardly canted forward uprights 30, fixed, at their lower ends, as indicated at 34, to the outer sides of the frame side members 20, and secured, at their upper ends, as indicated at 36 to the outer sides of the trough end walls 26, at the forward ends thereof; and by means of forwardly canted rear uprights 40, secured at their lower ends, as indicated at 42, to the frame side members, and to the trough end walls, as indicated at 44. The rear uprights 40 extend above the trough and are connected at their upper ends by a cross member 38, which acts to brace the trough support means.

Mounted on the base frame 14, behind the trough, is an upstanding guard 46, which comprises an inverted U-shaped frame 48, having bight portion 50, located on a level near to but below the cross member 38 of the rear trough support means, and depending legs 52, which, at their lower ends, are pivoted to the base frame side members, as indicated at 54, at the outsides of the side members. Fixed to and extending between the legs 52, are vertically spaced guard bars 56, which are flush with the rear edges of the legs 52, as seen in FIGURE 3. The purpose of the guard 46 is to prevent animals from approaching, and possibly thereby damaging the device, from the rear side of the device, instead of from the front of the device. As shown in full and in phantom lines in FIGURE 3, the guard 46 is adapted to be swung rearwardly, as in phantom lines, out of forward guard position, to enable free access to the trough 22, by an attendant, for servicing the trough and working on the operating mechanism. The purpose of the guard is served, in the event that the device is installed against a fence or a wall, by such fence or wall (not shown).

The trough 22 is provided with a flat lid 58 which is hinged, as indicated at 60, to the forward edge of a narrow cover board 59, which is suitably fixed upon the upper edge of the trough at the elevated rear end thereof. As is clear from FIGURES 1 and 2, the lid 58 is longer than the trough, and has end portions 62 which extend beyond the ends of the trough, and which serve as engagers for rollers, as described hereinbelow. Fixed to the underside of the lid 58, is a weight 64 which is located within and between the end portions 62, and which enters the trough in the closed position of the lid.

A longitudinally elongated flat treadle plate 66 overlies the forward part of the base frame 14 and is hinged, as indicated at 68, at its forward edge, to the front cross member 16 of the frame 14, in a manner that the treadle plate cannot subside below a horizontal position in which it rests upon the cross member 16 and upon the frame side members 20, in the depressed position of the treadle plate.

At locations near to and spaced inwardly from the base frame side members 20, there are fixed, as indicated at 70, to the underside of the treadle plate 66, a pair of rearwardly extending, rigid straight flat bar cam arms 72, which reach to points spaced rearwardly from the trough 22, and have rear ends 74. The cam arms 72 have channels 76 at their rear ends, which have upstanding laterally spaced side flanges 78, which are formed with rows of aligned holes 80 in selected ones of which are secured, single roller shafts 81, on which are journaled, between the side flanges, grooved rollers 82, which are spaced slightly above the webs 84 of the channels.

Longitudinally spaced journal brackets 86 are fixed, as indicated at 88, to the underside of the trough bottom wall 24, through which is journaled a longitudinal rock shaft 90, whose axis of rotation is located at a point close to but spaced from the rear wall 30 of the trough 22, so that the rock shaft is preferably at a location not forwardly of the hinge axis of the trough lid 58.

The rock shaft 90, as is clear from FIGURES 2 and 4, is longer than the trough 22, and has sleeves 92 which are adjustably secured on its ends, outwardly of the ends of the trough, as by means of set screws 94, the sleeves being fixed on the depressed rear ends of straight, forwardly inclined cam levers 96, which have clevises 98 on their elevated forward ends, which carry therein cam rollers 100, which bear rollably against the under-surfaces of the end portions 62 of the trough lid 58.

Also fixed on the rock shaft 90, at points spaced inwardly of the cam arms 96, and overlying related ones of the cam arms 72 are rearwardly declining cam follower rods 102, which are downwardly bowed, and have upwardly and rearwardly curved rear end terminal cam portions 104 which are operatively engaged in the grooves of the rollers 82 and with the web 84 of the channels 76.

In operation, the trough lid 58 being automatically closed by the weight 64 thereon, when the weight of an animal does not rest upon the treadle plate 66, and the treadle plate 66 being in an elevated position, as a result, the cam arms 72 are cammed upwardly, as shown in FIGURE 1, by the rearward movements of the cam follower rod terminals 104, engaged with the undersides of the rollers 82. When the weight of an animal is placed on the elevated treadle plate 66, and the same is, as a result, depressed, the cam arms 72, and thereby the rollers 82, are depressed, so that the cam rods 72, and thereby the rock shaft 90, are rotated downwardly and rearwardly, so that the cam levers 96 rise and apply their rollers 100 to the underside of the trough lid 58 and thereby elevate the lid to its open position, as shown in FIGURE 3, so that the animal has free access to the contents of the trough 22, as long as the animal stands on the treadle plate 66.

Although there has been shown and described herein a preferred form of the invention, it is to be understood that the invention is not necessarily confined thereto, and that any change or changes in the structure of and in the relative arrangements of components are contemplated as being within the scope of the invention as defined by the claims appended hereto.

What is claimed is:

1. An automatic feeding device comprising a ground-supported frame, a trough mounted on and spaced above said frame, said trough having an open top, a weighted lid hinged on the trough to close said open top in the depressed position of the lid, a treadle plate hinged on said frame, a cam arm fixed at one end on said treadle plate and extending beneath the trough, cam means on the other end of the cam arm, a rock shaft journaled on the trough at a level below said lid and its hinge axis, said lid having portions extending beyond ends of the trough, cam lever arms fixed on said rock shaft having free ends bearing against the undersides of said portions of the lid, and a cam follower rod fixed on said rock shaft, said rod being operatively engaged with the underside of said cam means.

2. An automatic feeding device comprising a horizontal ground-supported frame having front and rear members and side members, a feed containing trough mounted on and spaced upwardly from an intermediate part of said frame, said trough having an open top and a bottom wall, a lid hinged on the trough at and for closing said open top in a depressed postion of the lid, a rock shaft journaled on the trough in the region of said bottom wall, cam lever arms fixed on said shaft and having free ends operatively bearing against the underside of the lid at related ends of the lid, a treadle plate hinged on the front frame member, cam arms having forward ends fixed to the treadle plate, said cam arms extending rearwardly beneath the trough and having rear ends, channels fixed on the cam arms at their rear ends, having side flanges and webs, grooved rollers journaled on and between said side flanges, and cam follower rods fixed to said rock shaft and extending rearwardly from the rock shaft and operatively engaged between the cam arm channel rollers and the webs of the channels.

3. An automatic feeding device comprising a horizontal ground-supported frame having front and rear members and side members, a feed containing trough mounted on and spaced upwardly from an intermediate part of said frame, said trough having an open top and a bottom wall, a lid hinged on the trough at and for closing said open top in a depressed position of the lid, a rock shaft journaled on the trough in the region of said bottom wall, cam lever arms fixed on said shaft and having free ends operatively bearing against the underside of the lid at related ends of the lid, a treadle plate hinged on the front frame member, cam arms having forward ends fixed to the treadle plate, said cam arms extending rearwardly beneath the trough and having rear ends, channels fixed on the cam arms at their rear ends, having side flanges and webs, grooved rollers journaled on and between said side flanges, and cam follower rods fixed to said rock shaft and extending rearwardly from the rock shaft and operatively engaged between the cam arm channel rollers and the webs of the channels, said cam levers having rollers on their free ends, and said lid having end portions reaching beyond related ends of the trough, the cam lever rollers being engaged with said end portions.

4. An automatic feeding device comprising a ground-supported frame, a trough mounted on and spaced above said frame, said trough having an open top, a weighted lid hinged on the trough to close said open top in the depressed position of the lid, a treadle plate hinged on said frame, a cam arm fixed at one end on said treadle plate and extending beneath the trough, cam means on the other end of the cam arm, a rock shaft journaled on the trough at a level below said lid and its hinge axis, said lid having portions extending beyond ends of the trough, cam lever arms fixed on said rock shaft having free ends bearing against the undersides of said portions of the lid, and a cam follower rod fixed on said rock shaft, said rod being operatively engaged with the underside of said cam means, said trough being canted toward the treadle plate.

5. An automatic feeding device comprising a ground-supported frame, a trough mounted on and spaced above said frame, said trough having an open top, a weighted lid hinged on the trough to close said open top in the depressed position of the lid, a treadle plate hinged on said frame, a cam arm fixed at one end on said treadle plate and extending beneath the trough, cam means on the other end of the cam arm, a rock shaft journaled on the trough at a level below said lid and its hinge axis, said lid having portions extending beyond ends of the trough, cam lever arms fixed on said rock shaft having free ends bearing against the undersides of said portions of the lid, and a cam follower rod fixed on said rock shaft, said rod being operatively engaged with the underside of said cam means, and an upstanding guard mounted on the frame at the side of the trough remote from the treadle.

6. An automatic feeding device comprising a ground-supported frame, a trough mounted on and spaced above said frame, said trough having an open top, a weighted lid hinged on the trough to close said open top in the depressed position of the lid, a treadle plate hinged on said frame, a cam arm fixed at one end on said treadle plate and extending beneath the trough, cam means on the other end of the cam arm, a rock shaft journaled on the trough at a level below said lid and its hinge axis, said lid having portions extending beyond ends of the trough, cam lever arms fixed on said rock shaft having free ends bearing against the undersides of said portions of the lid, and a cam follower rod fixed on said rock shaft, said rod being operatively engaged with the underside of said cam means, and an upstanding guard mounted on the frame at the side of the trough remote from the treadle, said guard being hinged on the frame to be swung from a guarding position adjacent to the trough, to a retracted position providing free access to the trough.

7. In an automatic feeding device, a support, an open top feed trough mounted on said support, a lid hinged on the trough and normally closing the open top, a cam lever arm pivoted at one end to said trough below said lid, said lever arm having a free end bearing against the underside of the lid, a treadle hinged on said support, a cam arm fixed to the treadle and extending beneath the trough, said cam arm having cam means thereon, and a cam follower rod fixedly connected to said cam lever and having a free end portion operatively engaged beneath said cam means.

References Cited in the file of this patent

UNITED STATES PATENTS

| | | |
|---|---|---|
| 420,168 | Rogers | Jan. 28, 1890 |
| 2,447,745 | Eidson | Aug. 24, 1948 |